(12) United States Patent
Blackwood

(10) Patent No.: US 9,838,519 B1
(45) Date of Patent: Dec. 5, 2017

(54) MOBILE DEVICE FINGER HOLDER CASE

(71) Applicant: Michael A. Blackwood, Middletown, NY (US)

(72) Inventor: Michael A. Blackwood, Middletown, NY (US)

(*) Notice: Subject to any disclaimer, the term of this patent is extended or adjusted under 35 U.S.C. 154(b) by 0 days.

(21) Appl. No.: 15/374,185

(22) Filed: Dec. 9, 2016

(51) Int. Cl.
*H04M 1/00* (2006.01)
*H04M 1/02* (2006.01)

(52) U.S. Cl.
CPC .................. *H04M 1/0281* (2013.01)

(58) Field of Classification Search
CPC .................................................. H04M 1/0281
USPC ........................................................ 455/575
See application file for complete search history.

(56) References Cited

U.S. PATENT DOCUMENTS

| 5,305,381 | A | 4/1994 | Wang et al. |
| 5,961,016 | A | 10/1999 | Hartmann et al. |
| 6,816,713 | B2 | 11/2004 | Chen |
| 2006/0027724 | A1 | 2/2006 | Richter |
| 2009/0121026 | A1 | 5/2009 | Druker et al. |
| 2012/0031937 | A1* | 2/2012 | Baker .................. A45C 11/00 224/217 |
| 2012/0187706 | A1* | 7/2012 | Kannaka .................. A45F 5/00 294/137 |
| 2013/0146625 | A1 | 6/2013 | Karle et al. |
| 2013/0240380 | A1 | 9/2013 | Hansen |
| 2013/0277991 | A1 | 10/2013 | Wu |
| 2014/0335922 | A1 | 11/2014 | West et al. |
| 2015/0272307 | A1 | 10/2015 | Potter et al. |
| 2016/0233909 | A1 | 8/2016 | West |

* cited by examiner

*Primary Examiner* — Xin Jia
(74) *Attorney, Agent, or Firm* — The Law Firm of Andrea Hence Evans, LLC

(57) ABSTRACT

A mobile device case which enables a secure use of a mobile device using one hand. An aspect of an embodiment of the invention includes a multi-finger holder which is traversable across the rear of the case. The holder ensures a more secure grip by a user by way of finger holders which fit the user's fingers.

8 Claims, 4 Drawing Sheets

MOBILE DEVICE FINGER HOLDER CASE

FIELD OF THE INVENTION

The present invention relates, in general, to an apparatus adapted to enable a mobile device user to hold his/her mobile device, when in use, with the aid of the user's fingers.

BACKGROUND OF THE INVENTION

The touchscreens of mobile devices have simplified mobile device use over the years. However, using the touch screen of a mobile device may sometimes require both hands of the user in order to hold, balance and use the phone when the user engages in his/her use of the device, such as texting, surfing the web or making a phone call. Some users, however, have been able to do so with one hand, with some difficulty and with the risk of having the mobile device fall from their hand. As such, there is a need for an apparatus or device that enables one-hand use of mobile device's while securing the device within the user's hand.

SUMMARY OF THE INVENTION

An aspect of an embodiment of the present invention contemplates a mobile device case which may include a front enclosure, where the front enclosure is structurally configured to receive a mobile device, and a rear enclosure, having a top and a bottom, abutting the front enclosure. The rear enclosure includes a set of tracks at the rear enclosure's base, where the set of tracks extend from a left end of the rear enclosure to a right end of the rear enclosure. The set of tracks include a first track proximate or close to the rear enclosure's top and a second track proximate or close to the rear enclosure's bottom. The rear enclosure also includes a multi-finger holder, where the multi-finger holder itself includes first and second track legs, respectively positioned within the first and second tracks and for guiding the multi-finger holder along the set of tracks.

In an aspect of an embodiment of the present invention, the multi-finger holder includes three holders for three fingers.

In an aspect of an embodiment of the present invention, the set of tracks includes an overhang extending from each track's top edge. In one aspect, each of the multi-finger holder's track legs includes a slider at each track leg's base, with each slider extending under the overhang. This enables the sliders to slide under the overhang.

In an aspect of an embodiment of the present invention, both the first and second tracks include a pivoting enclosure at each respective end of the first and second track. In one aspect, the sliders pivot within each pivoting enclosure at either end of the tracks.

In an aspect of an embodiment of the present invention, the device case may include a first channel parallel to the first track and a second channel parallel to the second track, where the first channel is located between the rear enclosure's top and the first track and where the second channel is located between the second track and the rear enclosure's bottom.

In an aspect of an embodiment of the present invention, the device case may include a first pivoting pin, adjacent to the first track leg, and extending into the first channel, and a second pivoting pin, adjacent to the second track leg, and extending into the second channel, where the first and second pivoting pins enable the traversal of the multi-finger holder between the left and right ends of the rear enclosure. First and second pivoting pins also enable the pivoting of multi-finger holder to either fold or set it upright.

Additional aspects, objectives, features and advantages of the present invention will become apparent from the following description of the preferred embodiments with reference to the attached drawings.

DETAILED DESCRIPTION OF THE INVENTION

Figure 1:
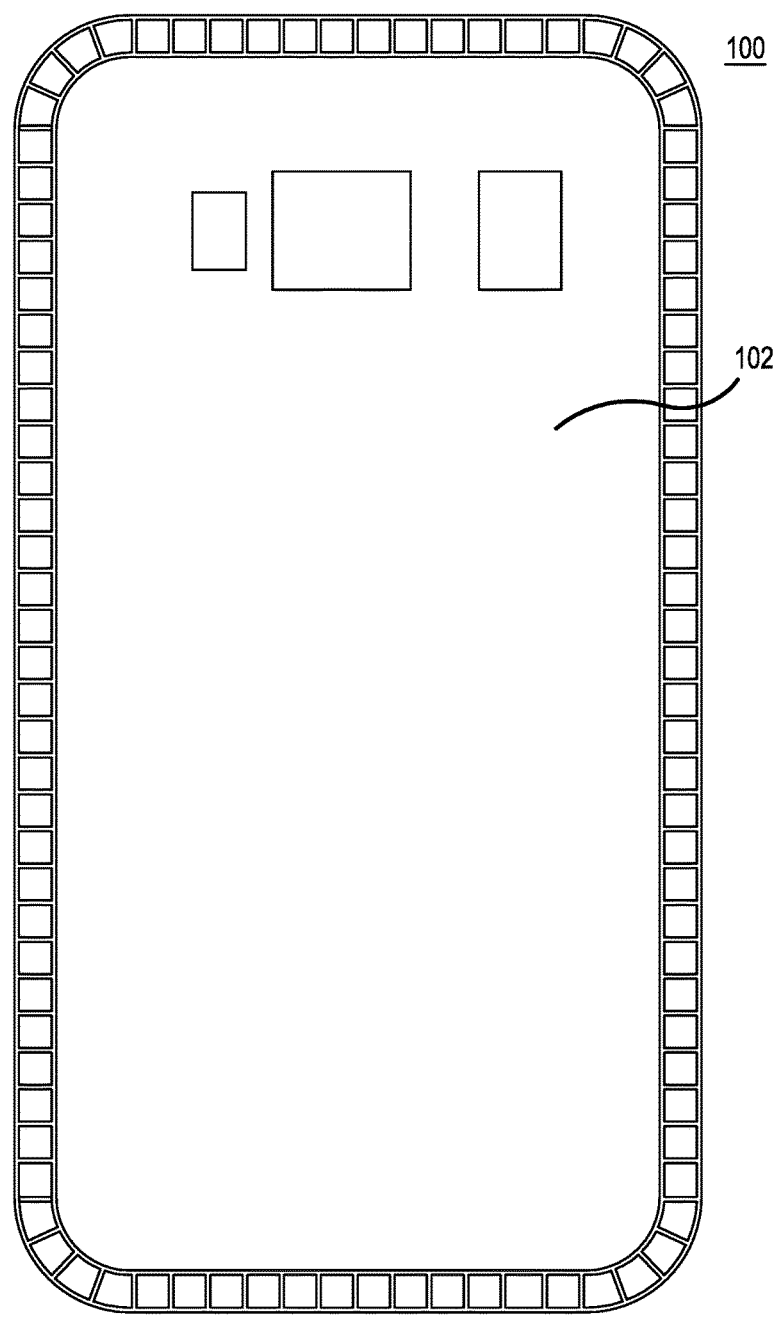
FIG. 1 illustrates a front enclosure of a mobile device case having a multi-finger holder apparatus according to an aspect of an embodiment of the present invention.

Referring now to FIG. 1, a front view of a mobile device case 100 is shown according to an aspect of an embodiment of the present invention. The front view of mobile device case 100 is shown having a front enclosure 102 within which a mobile device such as a mobile phone, may be placed. Aspects of embodiments of the present invention contemplate fenestrations within mobile device case 100 to accommodate different functional parts of a mobile device such as having a fenestration for the mobile device's camera lens.

Figure 2:
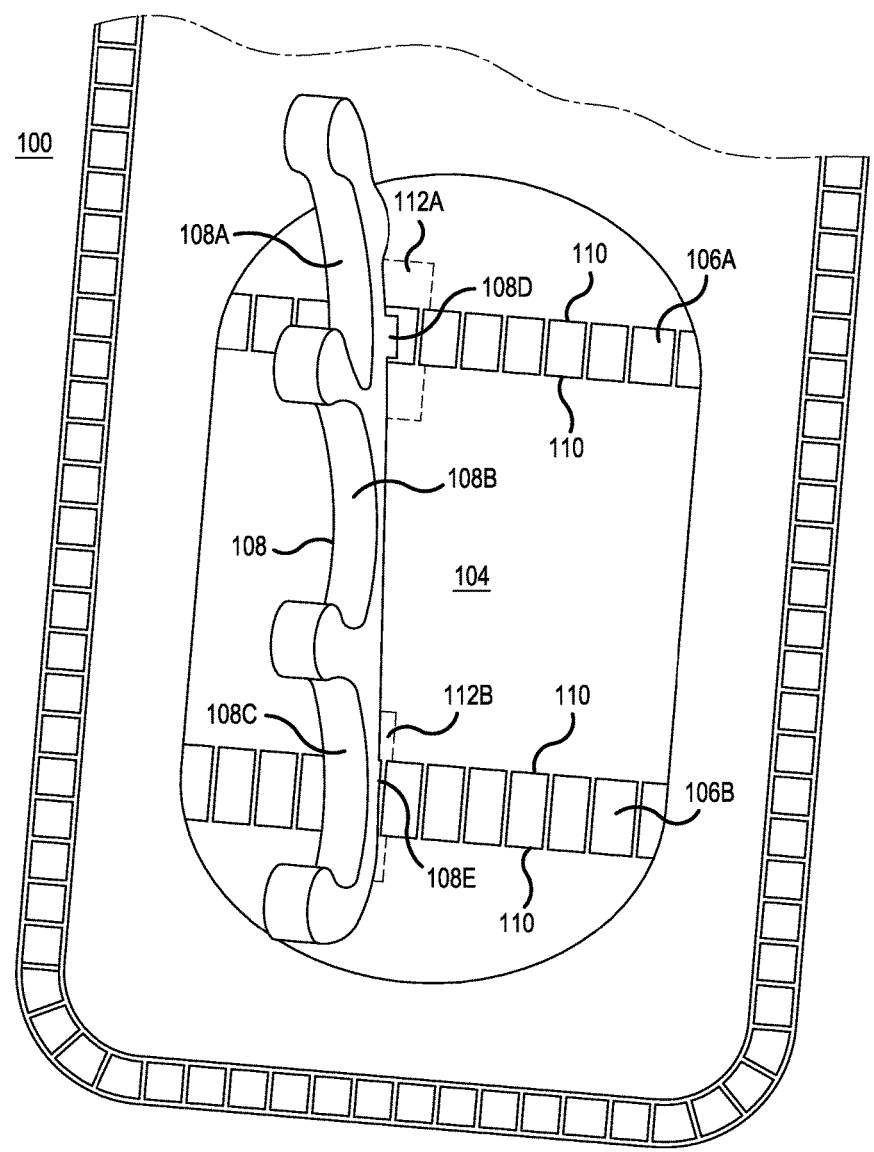
FIG. 2 illustrates a rear enclosure of a mobile device case having a multi-finger holder apparatus showing its multi-finger holder uprightly positioned according to an aspect of an embodiment of the present invention.
Figure 3:
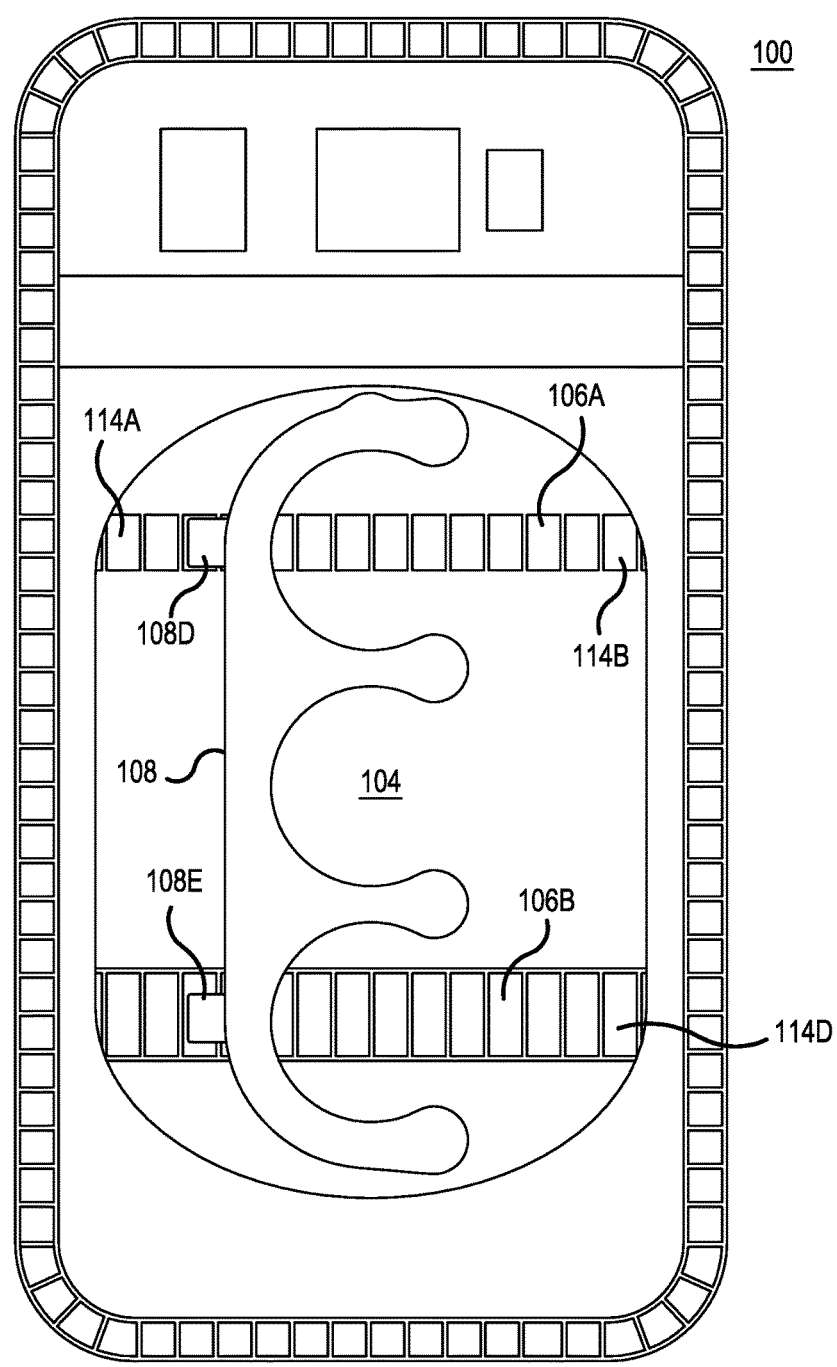
FIG. 3 illustrates a rear enclosure of a mobile device case having a multi-finger holder apparatus showing its multi-finger holder lowered according to an aspect of an embodiment of the present invention.

Referring now to FIGS. 2 and 3, rear enclosure 104 of mobile device case 100 is shown having multi-finger holder 108 uprightly positioned (FIG. 2) and folded (FIG. 3) according to aspects of embodiments of the present invention. Here, rear enclosure 104 of mobile device case 100 includes multi-finger holder 108 and set of tracks 106A and 106B. Tracks 106A and 106B may be positioned at the base of rear enclosure 104. Track 106A may, in one aspect of an embodiment of the present invention, be positioned proximate the top of rear enclosure 104 while track 106B may be positioned proximate the bottom of rear enclosure 104.

Multi-finger holder 108, in one aspect of an embodiment of the present invention, may include finger holders 108A-108C which are shaped to fit the fingers of a user. Upon use, multi-finger holder 108 may be raised to its upright position as shown. The user, after fitting his/her fingers into finger holders 108A-108C, may then slide the multi-finger holder to either side of rear enclosure 104 depending on whether the user is right or left handed. As such, a right-handed user may slide multi-finger holder 108 to the left end of rear enclosure 104 while a left-handed person may slide multi-finger holder 108 to the right end of rear enclosure 104 as shown in FIG. 2. Multi-finger holder 108 may be slid across tracks 106A and 106B by way of track legs 108D and 108E located at the base of multi-finger holder 108. Each of tracks 106A and 106B may, in one aspect of an embodiment of the present invention, include overhangs 110 which extend away from the top edge of each track while not entirely covering tracks 106A and 106B. For track legs 108D and 108E to remain within tracks 106A and 106B, each of track legs 108D and 108E may comprise of sliders 112A and 112B at the base of 108D and 108E which extend under overhang 110. In one aspect of an embodiment of the present invention, tracks 106A and 106B may include pivoting enclosures 114A-114D at the end of each track as shown. In one aspect of an embodiment of the present invention, sliders 112A and 112B may be cylindrical thereby enabling them to pivot within enclosures 114A-114D when the user seeks to set multi-finger holder 108 upright.

Figure 4:
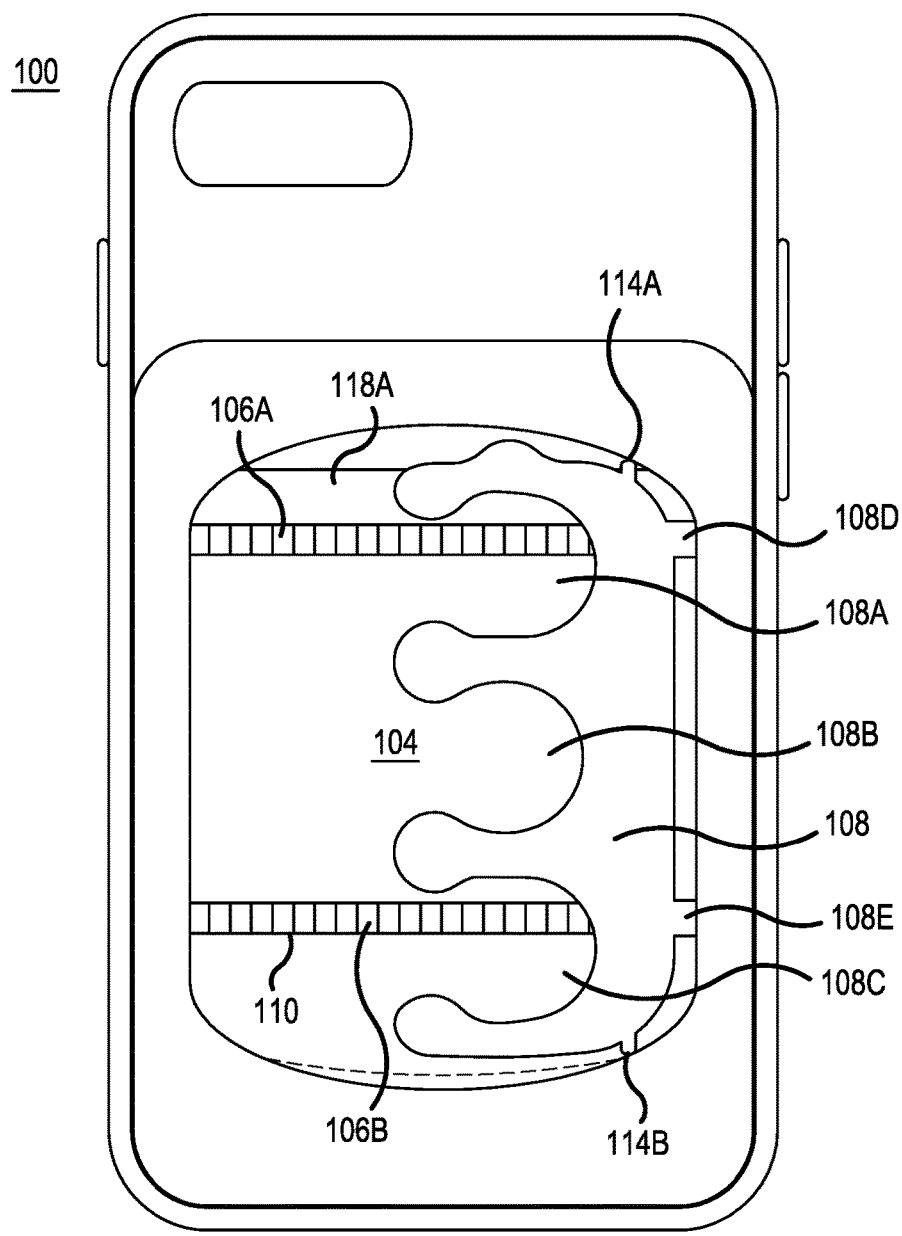
FIG. 4 illustrates a rear enclosure of a mobile device case having a multi-finger holder apparatus showing its multi-finger holder with pivoting pins according to an aspect of an embodiment of the present invention.

Referring now to FIG. 4 illustrates a rear enclosure 104 of a mobile device case 100 having a multi-finger holder 108 with pivoting pins 116A and 116B according to an aspect of an embodiment of the present invention. In this aspect, pivoting pins 116A and 116B enable the pivoting of multi-finger holder 108 from its folded position to its upright position or the other way around. In one aspect of an embodiment of the present invention, pivoting pins 116A and 116B may traverse through channels 118A and 118B respectively as the user slides multi-finger holder 108 along tracks 106A and 106B.

The invention has been described in detail with particular reference to certain preferred embodiments thereof, but it will be understood that variations and modifications can be effected within the spirit and scope of the invention.

What is claimed is:

1. A mobile device case comprising:
   a front enclosure, wherein the front enclosure is structurally configured to receive a mobile device; and
   a rear enclosure, having a top and a bottom, abutting the front enclosure, wherein the rear enclosure comprises of:
   a set of tracks at the rear enclosure's base, wherein the set of tracks extend from a left end of the rear enclosure to a right end of the rear enclosure, wherein the set of tracks comprise of a first track proximate the rear enclosure's top and a second track proximate the rear enclosure's bottom; and
   a multi-finger holder, wherein the multi-finger holder comprises of a first and second track legs, respectively positioned within the first and second tracks and for guiding the multi-finger holder along the set of tracks, and wherein the multi-finger holder comprises a plurality of separate finger holders, each accommodated to fit a single finger.

2. The device case of claim 1, wherein the multi-finger holder comprises of three separate finger holders.

3. The device case of claim 1, wherein the set of tracks comprises of an overhang extending from each track's top edge.

4. The device case of claim 3, wherein the multi-finger holder's track legs comprises of sliders at each track leg's base, wherein the sliders slide under the overhang.

5. The device case of claim 1, wherein both the first and second tracks comprise of a pivoting enclosure at each respective end of the first and second track.

6. The device case of claim 5, wherein the sliders pivot within each pivoting enclosure at either end the tracks.

7. The device case of claim 1, further comprising of a first channel parallel to the first track and a second channel parallel to the second track, wherein the first channel is located between the rear enclosure's top and the first track and wherein the second channel is located between the second track and the rear enclosure's bottom.

8. The device case of claim 7, further comprising of:
   a first pivoting pin, adjacent to the first track leg, and extending into the first channel; and
   a second pivoting pin, adjacent to the second track leg, and extending into the second channel, wherein the first and second pivoting pins enable the traversal of the multi-finger holder between the left and right ends of the rear enclosure.

* * * * *